(12) United States Patent
Kim et al.

(10) Patent No.: US 8,920,965 B2
(45) Date of Patent: Dec. 30, 2014

(54) RECHARGEABLE BATTERY

(75) Inventors: Jun-Sik Kim, Yongin-si (KR); Jae-Min Yang, Yongin-si (KR); Jae-Hyun Hwang, Yongin-si (KR); Sung-Soo Kim, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 271 days.

(21) Appl. No.: 12/869,160

(22) Filed: Aug. 26, 2010

(65) Prior Publication Data

US 2011/0123855 A1    May 26, 2011

(30) Foreign Application Priority Data

Nov. 24, 2009    (KR) ........................ 10-2009-0114166

(51) Int. Cl.
*H01M 2/02*      (2006.01)
*H01M 10/04*     (2006.01)
*H01M 10/6553*   (2014.01)
*H01M 2/26*      (2006.01)
*H01M 2/10*      (2006.01)

(52) U.S. Cl.
CPC ...... *H01M 10/0436* (2013.01); *H01M 10/5051* (2013.01); *H01M 2/266* (2013.01); *H01M 2/0212* (2013.01); *H01M 2/1011* (2013.01)
USPC .......... 429/178; 429/138; 429/172; 429/179; 429/181

(58) Field of Classification Search
CPC .......... H01M 2/00; H01M 4/00; H01M 10/00
USPC ................. 429/138, 143, 144, 169, 170, 172, 429/178–181, 186
See application file for complete search history.

(56) References Cited

U.S. PATENT DOCUMENTS

2005/0031949 A1*   2/2005   Maeda .......................... 429/164
2009/0176155 A1*   7/2009   Choi ............................. 429/178

FOREIGN PATENT DOCUMENTS

| JP | 2002-231214 | 8/2002 |
| JP | 2005-142026 | 6/2005 |
| KR | 10-2005-0051870 | 6/2005 |
| KR | 10-2005-0121906 | 12/2005 |
| KR | 10-2006-0033642 | 4/2006 |
| KR | 10-2009-0075483 | 7/2009 |

OTHER PUBLICATIONS

Notice of Allowance dated Dec. 30, 2011 for corresponding KR Application No. 10-2009-0114166.

* cited by examiner

*Primary Examiner* — Patrick Ryan
*Assistant Examiner* — Ben Lewis
(74) *Attorney, Agent, or Firm* — Knobbe Martens Olson & Bear LLP

(57) ABSTRACT

A rechargeable battery comprises an electrode assembly comprising an anode, a cathode, and a separator, a case for receiving the electrode assembly, and an electrode terminal electrically connected to the electrode assembly and drawn outside the case. The anode and the cathode each comprises an electrode uncoated region exposed past the separator and including a current collector at an edge. The electrode terminal comprises a terminal plate having a first terminal portion adhered to a bottom surface of the current collector and a second terminal portion drawn outside the case, and a combiner installed on the terminal plate to surround and adhere to a side surface and a top surface of the current collector.

15 Claims, 7 Drawing Sheets

RECHARGEABLE BATTERY

RELATED APPLICATIONS

This application claims priority to and the benefit of Korean Patent Application No. 10-2009-0114166 filed in the Korean Intellectual Property Office on Nov. 24, 2009, the entire contents of which are incorporated herein by reference.

BACKGROUND

1. Field

The present technology relates to a rechargeable battery. More particularly, embodiments of the present invention relate to a combined structure of an electrode uncoated region and an electrode terminal.

2. Description of the Related Technology

A rechargeable battery is typically rechargeable, in contrast to a primary battery that is not capable of being recharged. A low-capacity rechargeable battery is typically applicable to small portable electronic devices, such as mobile phones or laptop computers, and a medium to large capacity rechargeable battery is typically used to drive a motor or store power for cases of an electric vehicle and a hybrid vehicle.

The rechargeable battery typically includes an electrode assembly in which anodes and cathodes are disposed with a separator therebetween, and a case for receiving the electrode assembly. The case can be made with laminate sheets on which a metallic layer and a resin layer are bonded. For example, the electrode terminal made of a metal board is fixed in combination with the electrode uncoated region inside the case through welding, and a part thereof is drawn outside the case across the bonded part of the case.

However, since the above-noted rechargeable battery has insufficient bonded area between the electrode terminal and the electrode uncoated region, and the thickness of the electrode uncoated region is much less, rigidity is degraded when the electrode terminal and the electrode uncoated region are bonded. Therefore, the bonding parts may be easily broken by external impact or vibration to thereby deteriorate durability, and resistance between the electrode uncoated region and the electrode terminal is increased to thus reduce output performance.

Also, the electrode uncoated region may have rough parts, such as burrs formed in the process of manufacturing the electrode assembly, and the rough part of the electrode uncoated region in the rechargeable battery can directly contact the case to damage the case. The damage to the case can substantially impact the reliability and safety of the rechargeable battery.

The above information disclosed in this Background section is only for enhancement of understanding of the background of the invention and therefore may contain information that does not form the prior art that is already known in this country to a person of ordinary skill in the art.

SUMMARY OF THE INVENTION

Embodiments of the present invention provide for a rechargeable battery with increased rigidity and durability by improving the bonding structure of an electrode terminal and an electrode uncoated region, and by increasing output performance by reducing the resistance between the electrode terminal and the electrode uncoated region.

Embodiments of the present invention provide for a rechargeable battery that avoids damaging the case by disconnecting a rough part of an electrode uncoated region from the case.

An embodiment of the present invention provides a rechargeable battery including an electrode assembly comprising an anode, a cathode, and a separator, a case for receiving the electrode assembly, and an electrode terminal electrically connected to the electrode assembly and drawn outside the case.

According to an embodiment, the anode and the cathode each comprises an electrode uncoated region exposed past the separator and including a current collector at an edge.

According to an embodiment, the electrode terminal comprises a terminal plate having a first terminal portion adhered to a bottom surface of the current collector and a second terminal portion drawn outside the case, and a combiner installed on the terminal plate to surround and adhere to a side surface and a top surface of the current collector.

According to an embodiment, the combiner comprises a side wall connected to the terminal plate and the side surface of the current collector, and a cover connected to the side wall and the top surface of the current collector.

According to an embodiment, the combiner is configured as a pair of members facing each other on two sides of the terminal plate.

According to an embodiment, the electrode terminal further comprises a sealer separated from the combiner and surrounding the terminal plate.

According to an embodiment, the rechargeable battery further comprises at least one weld passing through the cover, the current collector, and the terminal plate.

According to an embodiment, the cover and the terminal plate provide a recess portion through which the weld is formed to prevent the weld from protruding outside the cover and the terminal plate.

According to an embodiment, the rechargeable battery further comprises a conductive fastening member fastened to the cover, the current collector, and the terminal plate.

According to an embodiment, the current collector has a burr at an edge thereof, and the burr contacts the electrode terminal.

According to an embodiment, the height of the electrode terminal is equal to or greater than the thickness of the electrode assembly.

According to an embodiment, the case comprises an upper case and a lower case respectively including a receiver and a bonder.

According to an embodiment, the width of the electrode terminal is equal to or less than the width of the receiver.

According to an embodiment of the present invention, the contact area between an electrode terminal and the current collector is maximized and the electrode terminal and the current collector are firmly fixed together. Therefore, resistance between the electrode terminal and the current collector is minimized to increase output performance, and damage to the bonded part of the electrode terminal and the current collector caused by external impact or vibration is effectively suppressed. In addition, long-term reliability and safety of the rechargeable battery are increased by avoiding problems of damage to the case.

According to an embodiment of the present invention, a rechargeable battery comprises: an electrode assembly comprising a first electrode, a second electrode, a separator, and a current collector at an end of the electrode assembly; a case for receiving the electrode assembly; and an electrode terminal coupled with the current collector of the electrode assembly and drawn outside the case, wherein the electrode terminal at least partially surrounds the current collector.

According to an embodiment, the electrode terminal comprises: a first portion disposed along a bottom surface of the current collector; a second portion disposed along a side surface of the current collector; and a third portion disposed along a top surface of the current collector.

According to an embodiment, the third portion comprises an opening through which a weld couples the current collector and the electrode terminal.

According to an embodiment, the third portion comprises an opening through which a fastener couples the current collector and the electrode terminal.

According to an embodiment, the height of the electrode terminal is equal to or greater than the thickness of the electrode assembly.

DETAILED DESCRIPTION

Embodiments of the present invention will be described more fully hereinafter with reference to the accompanying drawings. As those skilled in the art would realize, the described embodiments may be modified in various different ways, all without departing from the spirit or scope of the present invention.

Figure 1:
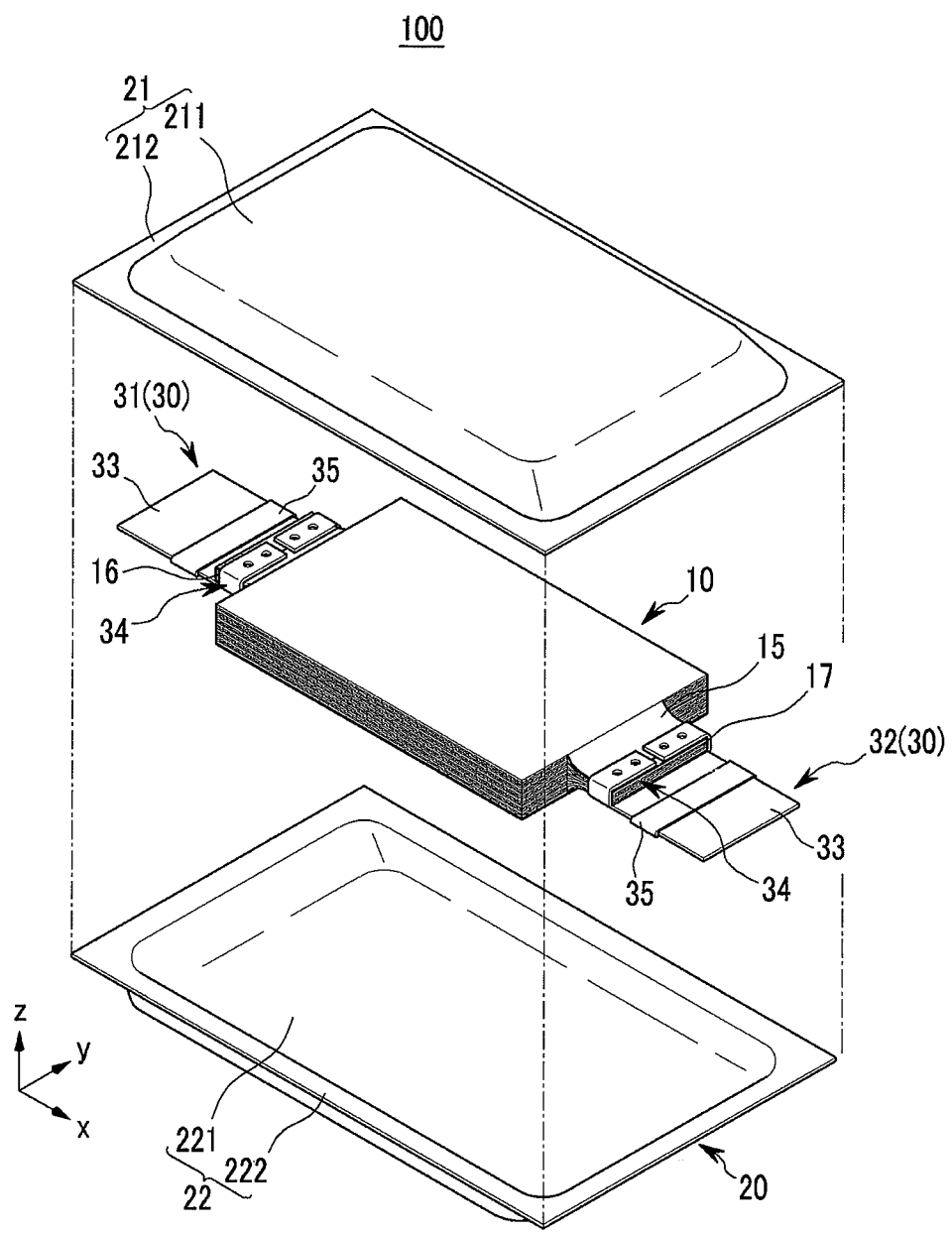
FIG. 1 shows an exploded perspective view of a rechargeable battery according to a first embodiment of the present invention.
Figure 2:
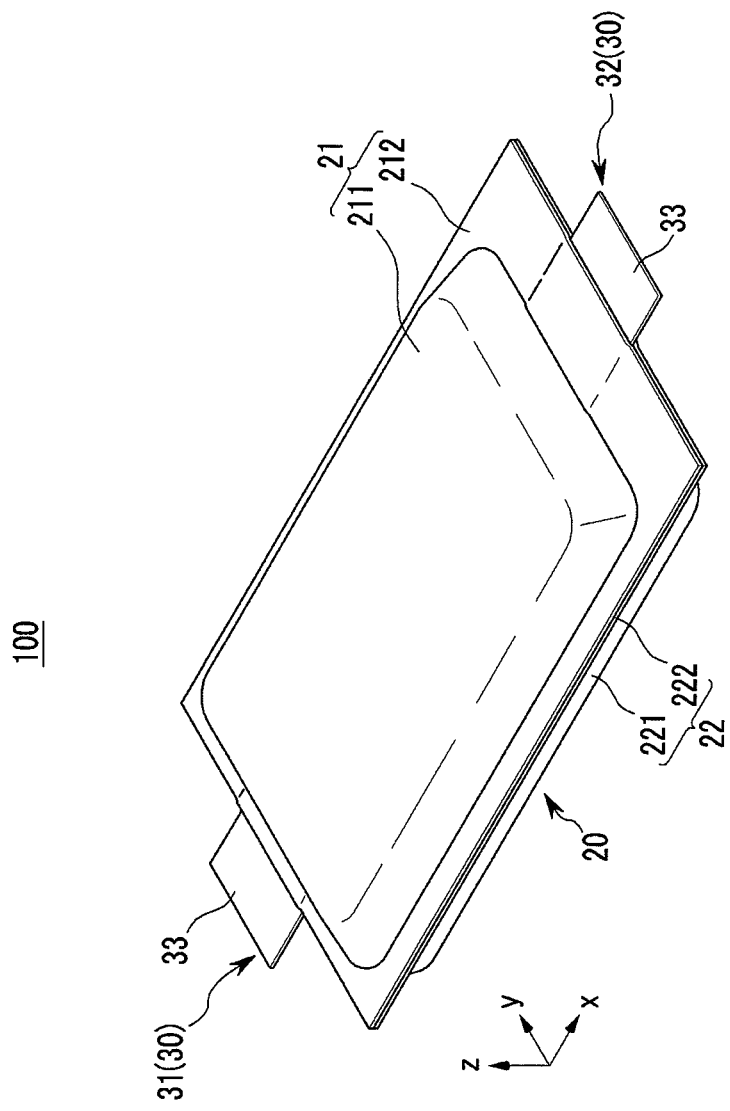
FIG. 2 shows a combined state perspective view of a rechargeable battery shown in FIG. 1.

FIG. 1 shows an exploded perspective view of a rechargeable battery 100 according to a first embodiment of the present invention, and FIG. 2 shows a combined state perspective view of a rechargeable battery shown in FIG. 1.

Referring to FIG. 1 and FIG. 2, the rechargeable battery 100 can include an electrode assembly 10, a case 20 for receiving the electrode assembly 10, and an electrode terminal 30 connected to the electrode assembly 10 and drawn outside the case 20. In this instance, the electrode terminal 30 may be formed to surround the top, bottom, and sides of an anode current collector 16 and a cathode current collector 17.

The electrode assembly 10 may have a stacked structure of a plurality sheets of anodes, separators, and cathodes, or it may have a structure in which a piece of an anode, a separator, and a cathode are stored and then rolled in a jelly roll form.

Figure 3:
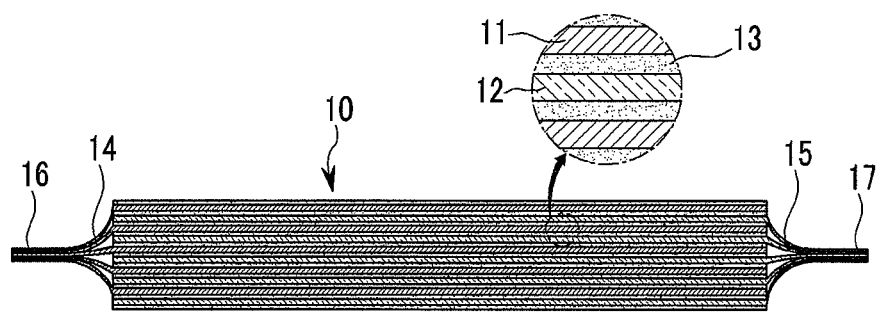
FIG. 3 shows a front view of an electrode assembly in a rechargeable battery shown in FIG. 1.

FIG. 3 shows a front view of an electrode assembly in a rechargeable battery shown in FIG. 1, exemplifying a layered electrode assembly.

Referring to FIG. 3, an anode 11 and a cathode 12 may respectively include an anode uncoated region 14 and a cathode uncoated region 15 exposed outside the separator 13. The anode uncoated region 14 may be in an area where no anode active material is coated on the anode current collector, and the cathode uncoated region 15 may be in an area in which no negative active material is coated on the cathode current collector.

The anode uncoated region 14 and the cathode uncoated region 15 can be drawn out to both sides of the electrode assembly 10, and can have a width that is less than that of the electrode assembly 10. The anode uncoated region 14 may include an anode current collector 16 that is coupled to the anode uncoated region 14, for example, by application of pressure. The cathode uncoated region 15 may include a cathode current collector 17 that is coupled to the cathode uncoated region 15, for example, by application of pressure.

The anode current collector 16 and the cathode current collector 17 can be provided in the center of the electrode assembly 10 in the thickness direction (z-axis direction) of the electrode assembly 10, as shown in FIG. 3, or can be provided on either side of the electrode assembly in the thickness direction of the electrode assembly 10.

Referring to FIG. 1 and FIG. 2 again, the electrode terminal 30 may include an anode terminal 31 that is combined with the anode current collector 16 and electrically connected to the anode 11, and a cathode terminal 32 that is combined with the cathode current collector 17 and is electrically connected to the cathode 12.

The case 20 may include an upper case 21 and a lower case 22, and may be manufactured with laminate sheets generated by bonding a metal layer and a resin layer by an adhesive layer. The upper case 21 and the lower case 22 can receive the electrode assembly 10 in an electrolyte impregnated state in the inner space, and close and seal the electrode assembly 10 since an edge may be bonded into a single body through thermo bonding. The upper case 21 and the lower case 22 can respectively include concave receivers 211 and 221 and bonders 212 and 222 surrounding the receivers 211 and 221.

Figure 4:
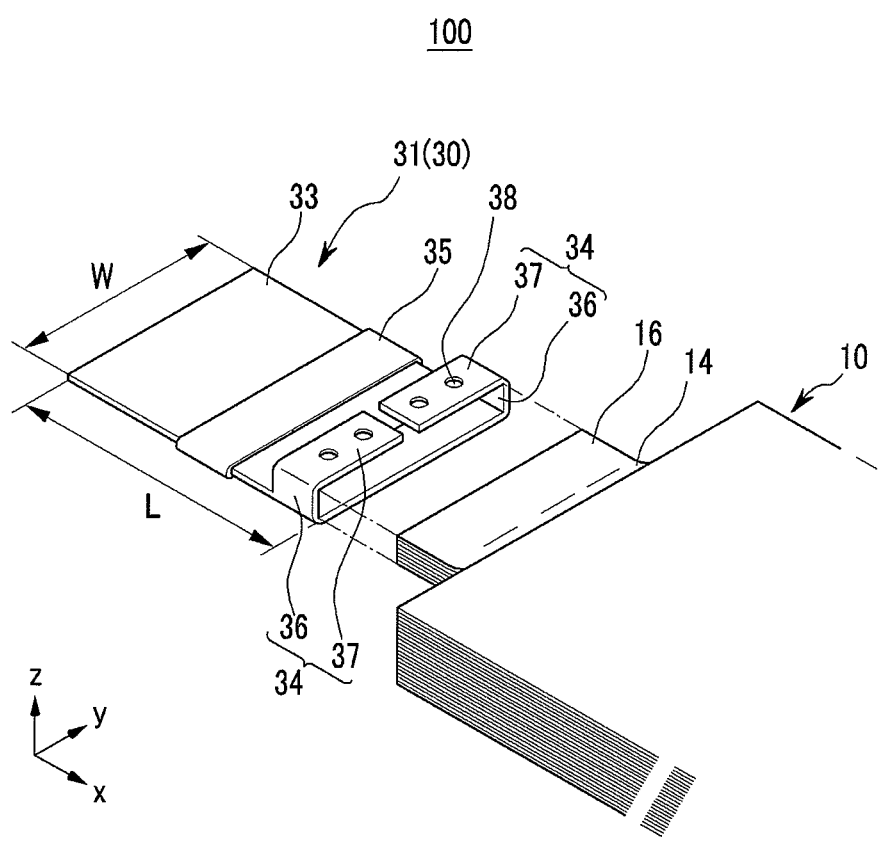
FIG. 4 shows a partial exploded perspective view of an anode terminal and an electrode assembly in a rechargeable battery shown in FIG. 1.
Figure 5:
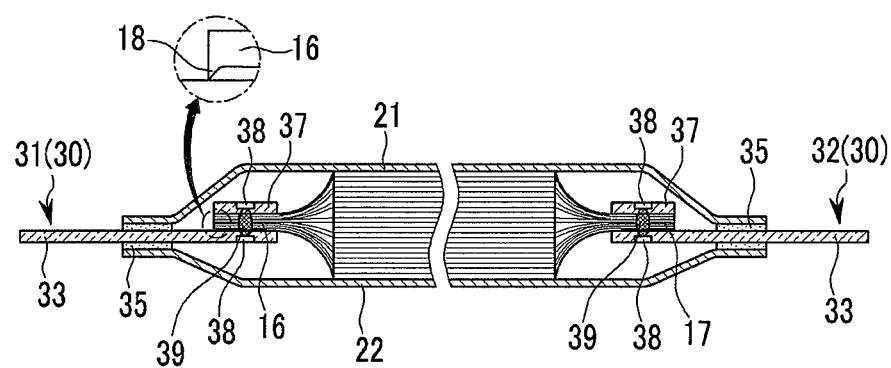
FIG. 5 shows a cross-sectional view of a rechargeable battery shown in FIG. 1.

FIG. 4 shows a partial exploded perspective view of an anode terminal and an electrode assembly in a rechargeable battery shown in FIG. 1, and FIG. 5 shows a cross-sectional view of a rechargeable battery shown in FIG. 1.

Referring to FIG. 4 and FIG. 5, the anode terminal 31 may include a terminal plate 33 having a first terminal adhered to the bottom of the anode current collector 16 and a second terminal drawn outside the case 20, a combiner 34 installed in the terminal plate 33 and combined with the anode current collector 16 to surround the top and sides of the anode current collector 16 and stick thereto, and a sealer 35 for surrounding the terminal plate 33 outside the combiner 34.

The cathode terminal 32 can have the same form as the anode terminal 31, and can surround the cathode current collector 17 to be combined therewith in a like manner.

The terminal plate 33 may be made of a metal board having a rectangular shape with a predetermined width (W, refer to FIG. 4) and length (L, refer to FIG. 4). The current collectors 16 and 17 may be disposed on a first terminal of the terminal plate 33 and overlapped on the terminal plate 33. Here, the current collector indicates the anode current collector 16 and the cathode current collector 17.

The combiner 34 may include a side wall 36 connected to the terminal plate 33 and surrounding the sides of the current collectors 16 and 17, and a cover 37 connected to the side wall 36 and surrounding the current collectors 16 and 17. The combiners 34 can be installed as a pair facing each other at two sides of the terminal plate 33 in the width direction of the terminal plate 33, and two covers 37 can be provided with a gap therebetween.

A recess portion 38 may be formed on the cover 37 and the terminal plate 33 in the thickness direction (z-axis direction) of the current collectors 16 and 17 to partially reduce the thickness, and the electrode terminal 30 and the current collectors 16 and 17 may be bonded at the recess portion 38 through spot welding.

There can be multiple welds 39 at each cover 37. In this instance, the weld 39 is generated when the cover 37, the current collectors 16 and 17, and the terminal plate 33 are melted by heat to be bonded and rigid.

Before the weld 39 is formed, the gap between the terminal plate 33 and the cover 37 can be the sum of the thickness of the current collectors 16 and 17 and an entrance slide margin of the current collectors 16 and 17. Accordingly, the current collectors 16 and 17 are not firmly adhered to the terminal plate 33 and the cover 37 in their initial entrance, and pressure may be applied thereto when the weld 39 is formed, thereby maintaining a rigidly adhered state of the current collectors 16 and 17 to the terminal plate 33 and the cover 37.

The sealer 35 contacting the upper case 21 and the lower case 22 may be provided at a point where they are bonded, and can be made of an insulating polymer. The sealer 35 may be provided to be separated from the combiner 34 in the length direction (x-axis direction) of the terminal plate 33, and may be formed with a predetermined width to surround the top, bottom, and sides of the terminal plate 33. The sealer 35 can insulate the case 20 and the electrode terminal 30, and protect the electrode terminal 30 while thermally bonding the case 20.

As described, since the electrode terminal 30 wraps most of the surfaces of the current collectors 16 and 17, the contact area with the current collectors 16 and 17 may be maximized, and the current collectors 16 and 17 bonded with the top and bottom of the electrode terminal 30 may be firmly attached to the electrode terminal 30.

Therefore, the rechargeable battery 100 of the first illustrated embodiment can increase output performance of the rechargeable battery 100 between the electrode terminal 30 and the current collectors 16 and 17, and can efficiently suppress damage to the bonded part by external impact or vibration by increasing durability of the bonded part of the electrode terminal 30 and the current collectors 16 and 17.

Also, since the electrode terminal 30 surrounds the top, bottom, and sides of the current collectors 16 and 17, when a rough part such as a burr occurs at the edge of the current collectors 16 and 17 while manufacturing the electrode assembly 10, the rough part does not contact the case. The magnified circle in FIG. 5 shows a burr 18.

Further, the weld 39 of the current collectors 16 and 17 does not contact the case 20 because the weld 39 is formed to not protrude outside the cover 37 and the terminal plate 33, since recess portions 38 are formed on the cover 37 and on the terminal plate 33, and the weld 39 is formed 38 by spot welding the electrode terminal 30 and the current collectors 16 and 17 through the recess portions 38.

Thus, it is possible to prevent contact with and damage to the case 20 and thereby increase long-term reliability and safety of the rechargeable battery 100.

The entire height of the electrode terminal 30 including the combiner 34 may be equal to or less than the thickness of the electrode assembly 10. The width (W) of the terminal plate 33 can be equal to the width of the current collectors 16 and 17, and the entire width of the electrode terminal 30 can be equal to or less than the width of the receivers 211 and 221 of the case 20.

Therefore, generation of an unnecessary space in the electrode terminal 30 may be minimized in the rechargeable battery 100, and since the height difference between the electrode terminal 30 and the current collectors 16 and 17 is less, it is possible to prevent the weld 39 from being separated or damaged by external vibration or impact.

Figure 6:
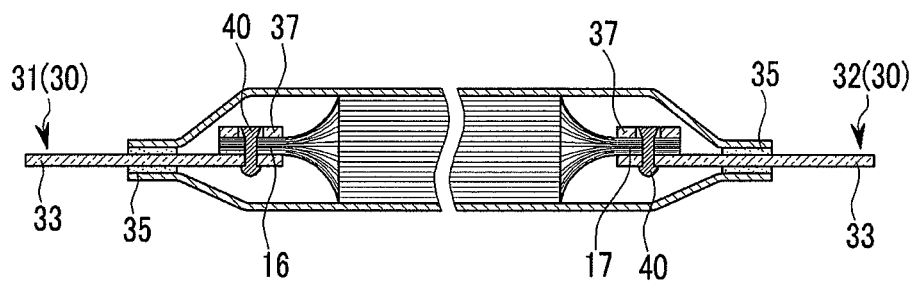
FIG. 6 shows a partially magnified cross-sectional view of a rechargeable battery according to a second embodiment of the present invention.

FIG. 6 shows a partially magnified cross-sectional view of a rechargeable battery 200 according to a second embodiment of the present invention.

Referring to FIG. 6, the rechargeable battery 200 according to the exemplary embodiment has the same configuration as the rechargeable battery according to the first embodiment, except for the use of a rivet 40 in combining the electrode terminal 30 and the current collectors 16 and 17, rather than a weld. The same members as those of the rechargeable battery according to first embodiment use the same reference numerals.

Figure 7:
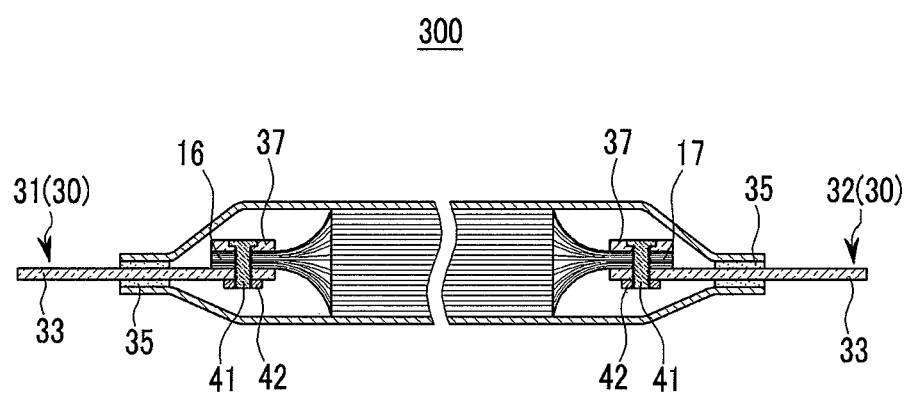
FIG. 7 shows a partially magnified cross-sectional view of a rechargeable battery according to a third embodiment of the present invention.

FIG. 7 shows a partially magnified cross-sectional view of a rechargeable battery 300 according to a third embodiment of the present invention.

Referring to FIG. 7, the rechargeable battery 300 according to the third embodiment has the same configuration as that of the rechargeable battery according to the first exemplary embodiment, except for the use of a bolt 41 and nut 42 assembly in combining the electrode terminal 30 and the current collectors 16 and 17, rather than a weld. The same members as those of the rechargeable battery according to the first embodiment use the same reference numerals.

In the second embodiment and the third embodiment, conductive fastening members such as the rivet 40 or the bolt 41 may be used to fasten the electrode terminal 30 and the current collectors 16 and 17. In this case, an opening may be formed to be passed through the cover 37, the current collectors 16 and 17, and the terminal plate 33, and the conductive fastening member may be provided to be sequentially passed through the cover 37, the current collectors 16 and 17, and the terminal plate 33.

The rivet 40 can be fixed to the terminal plate 33 by transforming a second terminal while maintaining a first terminal, and the bolt 41 can be fixed to the terminal plate 33 by inserting the nut 42 into a first terminal.

While certain embodiments of this invention have been described, it is to be understood that the invention is not limited to the disclosed embodiments, but on the contrary, is intended to cover various modifications and equivalent arrangements included within the spirit and scope of the appended claims.

What is claimed is:

1. A rechargeable battery comprising:
an electrode assembly comprising an anode, a cathode, and a separator;
a case having inner walls for receiving the electrode assembly wherein the electrode assembly is positioned adjacent the inner walls of the case and wherein the case defines a first continuous inner volume; and
an electrode terminal electrically connected to the electrode assembly and drawn outside the case, wherein
the anode and the cathode each comprises an electrode uncoated region exposed past the separator and including a current collector at an edge, and
the electrode terminal comprises:
a terminal plate having a first terminal portion positioned within the case and adhered to a bottom surface of the current collector and a second terminal portion drawn outside the case;
a combiner installed on the first terminal portion of the terminal plate so as to be positioned within the case to surround and adhere to a side surface and a top surface of the current collector wherein the current collector is positioned within the first inner volume so that the current collector is positioned proximate to the electrode assembly; and at least one weld passing through the cover, the current collector, and the terminal plate, wherein the cover and the terminal plate provide a recess portion through which the weld is formed to prevent the weld from protruding outside the cover and the terminal plate, thereby preventing the weld from contacting the case.

2. The rechargeable battery of claim 1, wherein the combiner comprises:

a side wall connected to the terminal plate and the side surface of the current collector; and a cover connected to the side wall and the top surface of the current collector.

3. The rechargeable battery of claim 2, wherein the combiner is configured as a pair of members facing each other on two sides of the terminal plate.

4. The rechargeable battery of claim 1, wherein the electrode terminal further comprises a sealer separated from the combiner and surrounding the terminal plate.

5. The rechargeable battery of claim 2, wherein the rechargeable battery further comprises a conductive fastening member fastened to the cover, the current collector, and the terminal plate.

6. The rechargeable battery of claim 1, wherein the current collector has a burr at an edge thereof, and the burr contacts the electrode terminal.

7. The rechargeable battery of claim 1, wherein the height of the electrode terminal is equal to or greater than the thickness of the electrode assembly.

8. The rechargeable battery of claim 7, wherein the case comprises an upper case and a lower case respectively including a receiver and a bonder.

9. The rechargeable battery of claim 8, wherein the width of the electrode terminal is equal to or less than the width of the receiver.

10. A rechargeable battery comprising:

an electrode assembly comprising a first electrode, a second electrode, a separator, and a current collector at an end of the electrode assembly;

a case having inner walls for receiving the electrode assembly wherein the electrode assembly is positioned adjacent the inner walls of the case wherein the case defines a first continuous inner volume; and an electrode terminal coupled with the current collector of the electrode assembly and drawn outside the case, wherein the electrode terminal at least partially surrounds the current collector and is positioned inside of the case wherein the electrode terminal is positioned within the first continuous inner volume so that the electrode terminal is positioned proximate to the electrode assembly, wherein the electrode terminal comprises a first portion disposed along a bottom surface of the current collector, a second portion disposed along a side surface of the current collector, and a third portion disposed along a top surface of the current collector, and wherein the third portion comprises an opening through which a coupling means couples the current collector and the electrode terminal, wherein the opening is configured to prevent the coupling means from contacting the case.

11. The rechargeable battery of claim 10, wherein coupling means is a weld.

12. The rechargeable battery of claim 10, wherein coupling means is a fastener.

13. The rechargeable battery of claim 10, wherein the height of the electrode terminal is equal to or greater than the thickness of the electrode assembly.

14. The rechargeable battery of claim 10, wherein the coupling means is a rivet.

15. The rechargeable battery of claim 10, wherein the coupling means is a bolt.

* * * * *